Nov. 15, 1966 U. COCCA ETAL 3,285,130
LIGHT SWITCHING MEANS FOR SELECTIVELY CONTROLLING
THE INTENSITY OF A LIGHT BEAM
Original Filed July 5, 1961 2 Sheets-Sheet 1

INVENTORS
UBERT COCCA
RAYMOND P. PECORARO

BY *Norman P. Bardalee*

ATTORNEY

FIG. 3
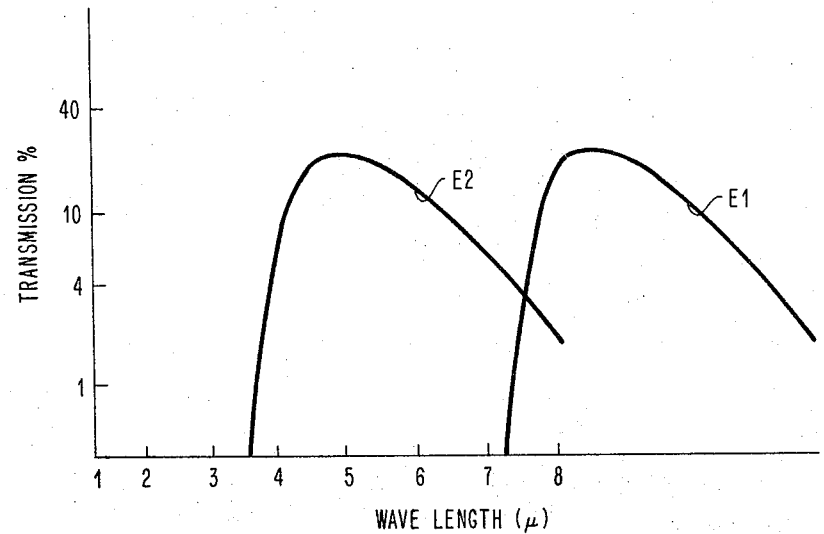
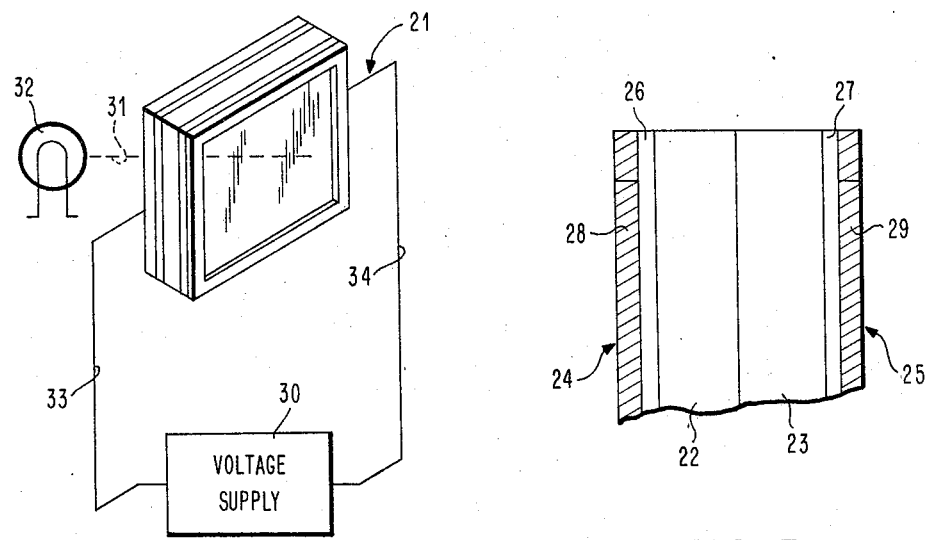
FIG. 4
FIG. 5

United States Patent Office 3,285,130
Patented Nov. 15, 1966

3,285,130
LIGHT SWITCHING MEANS FOR SELECTIVELY CONTROLLING THE INTENSITY OF A LIGHT BEAM
Ubert Cocca, Apalachin, and Raymond Pecoraro, Wappingers Falls, N.Y., assignors to International Business Machines Corporation, New York, N.Y., a corporation of New York
Original application July 5, 1961, Ser. No. 121,954, now Patent No. 3,247,765, dated Apr. 26, 1966. Divided and this application Sept. 27, 1965, Ser. No. 508,613
4 Claims. (Cl. 88—61)

This is a division of application Serial Number 121,954 filed July 5, 1961 and now Patent Number 3,247,765 issued April 26, 1966.

The present invention relates broadly to switching of a beam of light and in particular to a means for selectively controlling the intensity of such a beam.

In a number of different applications, an important functional operation is the switching or modulation of a beam of light, that is, the varying of the intensity of the beam between specified limits, or from extinction to one or more positive values of intensity.

Where a pulsating or modulated beam of relatively low or moderate frequency is required, there are conventional mechanical light interrupting means or shutter mechanisms which are satisfactory for most purposes. However, it is clear that there are practical limits in the frequency obtainable and in speed of response of such mechanical means. Additionally, if rather than a mere "on-off" condition of the light beam, it is desired to have a continuously variable light beam such as, for example, exhibiting a change in intensity representative of a sine wave function of high periodicity, mechanical shutter means are in general not satisfactory.

Briefly, the invention comprises locating a sheet of specially prepared semiconducting material in the path of a beam of light of relatively narrow bandpass so that the beam impinges on one major surface of the sheet and emerges from the other major surface. The sheet is subjected to an electric field in the plane of the sheet. Selective variation of the field effects a corresponding change in the transmissivity of the semiconducting material thereby providing the required light modulation or light shuttering.

It is therefore a primary object and purpose of the invention to provide a means for selectively varying the intensity of a beam of light at a predetermined rate and between preassigned magnitudes.

Another object of the invention is to provide a means for cyclically varying a light beam from extinction to predetermined intensity values.

A further object of the invention is the provision of a means for modulating a light beam in response to electrical field stimulation.

Another object of the invention is the provision of a means for modulating a beam of light having the capacity for selective and continuous variation of the periodicity of modulation.

The foregoing and other objects, features and advantages of the invention will be apparent from the following more particular description of a preferred embodiment of the invention, as illustrated in the accompanying drawings:

In the drawings:

FIG. 1 is a diagrammatic representation of the embodiment of the invention disclosed in the aforementioned patent application, Serial No. 121,954;

FIG. 2, a and b, is a perspective, fragmentary, enlarged view of a special modulating sheet for use in the device of FIG. 1;

FIG. 3 is a graph showing certain electrical and optical characteristics of the modulating sheet of FIGS. 1 and 2;

FIG. 4 is an embodiment of the invention of the present divisional application; and FIG. 5 is an enlarged fragmentary view of the special modulating sheet in the embodiment of FIG. 4.

Figure 1:
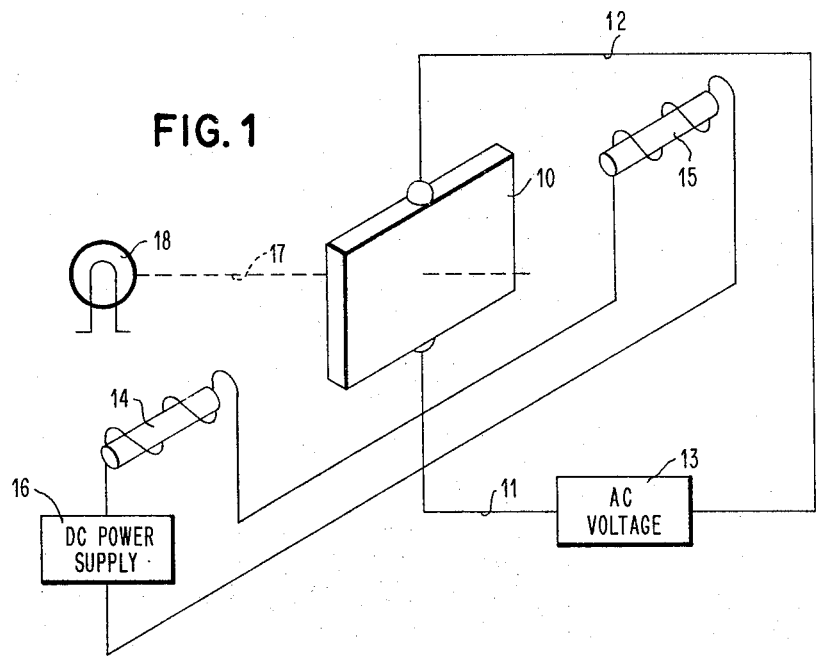

For ease of understanding, first a presentation of the pertinent fundamental physical facts upon which the operation of the invention, which is described in patent application, Serial No. 121,954, depends is given at this time. FIG. 3 illustrates certain experimentally observed characteristics of a specific semiconducting material, indium antimonide (InSb), and particularly the relationship of transmissivity to the wavelength of incident light for two values of carrier concentration provided, respectively, by subjecting the sample to a constant magnetic field (H) and different electric fields (E1, E2, where E2 is greater than E1). Thus, it is seen that for a given particular constant value of electric and magnetic fields, a relatively high degree of light transmission is obtained for the given sample over a well-defined range of wavelengths with the transmission dropping off beyond this range, and quite sharply so, on moving toward the "blue."

It is by controlling the relation of this sharply changing portion of the curve, which will be referred to in the following description as an absorption edge, to an incident light beam that the novel light modulation technique of the invention of the aforementioned patent application, Serial No. 121,954, is provided.

Assuming the magnetic field H to be maintained at a constant value, the graph indicates that an increase in the electric field impressed across the semiconductor sample results in a shifting of the absorption edge toward the blue, i.e., in the direction of shorter wavelengths. Accordingly, when the special sample was subject to a particular electrical field E1, incident electromagnetic radiation of, say, approximately 5 microns in wavelength suffers substantially complete extinction on passing therethrough. When, however, the electric field is increased to some higher value, E2, transmission for the same radiation range rises to approximately 20 percent.

Briefly, in explanation of this behavior, the high absorption characteristics of InSb have been found to be directly dependent on the extrinsic carrier concentration of the semiconductor, i.e., the number of holes and conduction electrons per unit volume. Accordingly, as the concentration increases the absorption edge corresponding to direct optical transition occurs at shorter wavelengths or, on the other hand, decreasing the carrier concentration results in a shifting of the absorption edge toward longer wavelengths. A more complete discussion of solid-state semiconducting materials and their carrier concentration characteristics is set forth in the text Optical Properties of Semiconductors by T. S. Moss, Academic Press, Incorporated, (1959), pages 231–234.

As already noted, the carrier concentration of semiconducting materials can be controlled in a given sample by selective variation of the magnitudes of electric and magnetic fields simultaneously impressed thereon. A full presentation of the more theoretical physical aspects involved in this type of control can be found in the article entitled Magnetic Barrier Layer in Germanium by E. Weisshaar and H. Welker in the publication Z. Naturforschung (1953).

Turning now particularly to FIG. 1, there is shown the embodiment of the device of the aforementioned patent application, Serial No. 121,954, which includes a modulating sheet 10 composed of a semiconducting material having its major surfaces treated in a special way as will be set forth below. A pair of conductors 11 and 12 are electrically connected to opposite edges of the sheet 10 for providing connection to a selectively variable source of supply 13 of A.C. voltage. A pair of electromagnets 14 and 15 are arranged along opposite edges of the sheet 10 for directing a magnetic field in the plane of the sheet and transversely of the direction of flow of electric current provided to the sheet through the conductors 11 and 12. The electromagnets 14 and 15 are series connected to a suitable D.C. power source 16 which is controllable to provide a selectively variable output over a given voltage range. A beam of light 17 is directed toward the sheet from a narrow bandpass light source 18.

Figure 2A:
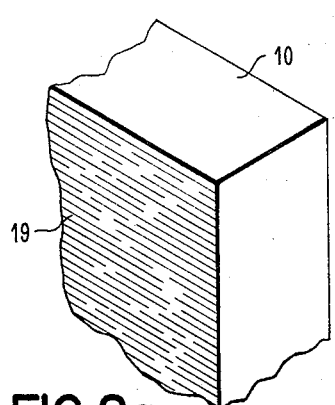
Figure 2B:
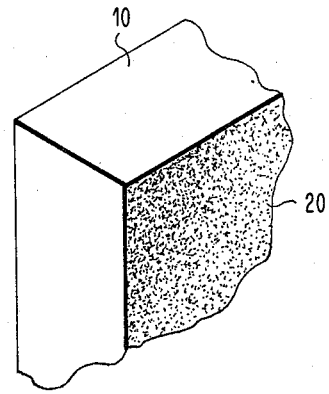

For the more detailed features of the modulating sheet 10 used in the embodiment of FIG. 1, reference should now be made to FIG. 2. The sheet is composed of N-type InSb of substantially square geometry 1 centimeter along each edge and has a thickness of approximately 30 microns. The principal surface 19 (FIGURE 2a) which first intercepts the light beam from the source 18 is specifically prepared to form what is termed in the above-noted reference material, a low recombination surface. Thus, by etching the surface 19 with a large number of closely spaced lines, the recombination velocity of the surface can be brought to a value of approximately 1000 cm./sec. The other principal surface 20 (FIGURE 2b), from which the modulated beam is emitted, is treated by sandblasting, for example, to provide what is termed a high recombination surface. By such a treatment, the recombination velocity in the regions adjacent this surface is in excess of 1,000,000 cm./sec.

The special treatment of the surfaces 19 and 20 cooperatively functions with the magnetic and electric fields to control the carrier concentration in the sheet 10 to an enhanced degree thereby effecting improved control of variation of the absorption edge of a modulation sheet subjected to given electric and magnetic fields.

Although either N- or P-type materials are satisfactory for the purposes of the invention of patent application, Serial No. 121,954, the N material is slightly superior in this respect and, for that reason, is specified in the above description.

Also in this connection, the thickness of the sheet 10 must be kept to such a value as to be able to provide a sufficiently high transmission for the intended use. This, of course, can vary depending on a particular use; however, for illustrative purposes a 30 micron sheet of InSb can provide a maximum transmission of approximately 20 percent which was fully satisfactory for present purposes.

When the semiconductor sheet of the described character is subjected to a magnetic field of 10,000 gauss and an electric field of 2.1 volts/cm. in the mutually orthogonal directions indicated in FIGURE 1, an absorption edge is found to exist at approximately 7.3 microns (FIG. 3). On reversing the electric field (or the magnetic field) the absorption edge is shifted so as to be in a region of about 3.6 microns. Thus, an incident monochromatic light beam of, say, 4.5 micron wavelengths under the first set of electric and magnetic field conditions is substantially extinguished, whereas under the second set of conditions about 20 percent of the light beam is transmitted through the modulating sheet. By changing the electric field some lesser amount, or between different limits intermediate those stated above, while maintaining the fixed magnetic field, a full and varied range of light modulation capability is obtained.

In the above description, the magnetic field, H, is fixed to some value while changes in transmission are effected by appropriate variation of the impressed electric field. Fully satisfactory results are also obtainable by maintaining a constant electric field in the sheet 10 and relying on selective variation of the magnetic field to achieve modulation or shuttering.

In FIG. 4, a light modulating apparatus according to the invention of the present application is shown which offers certain additional advantages, particularly in permitting elimination of a magnetic field as a requirement for light modulation. A special composite modulating sheet 21 is provided which is comprised of a P layer 22 and an N layer 23 arranged in a face contacting intimate relation to form a single integral sheetlike body. The junction of the two layers is formed in such a manner that the holes and the electrons can diffuse to either surface, i.e., the thickness of the composite sheet equals the diffusion length of the holes plus the diffusion length of the electrons. The formation of this type of diffusion junction is well known in the art, a suitable example of which is set forth on pages 64–90 of the text entitled Transistor Technology, volume III, edited by F. J. Biondi, published by D. Van Nostrand Company, Incorporated.

As before, the surface 24 facing the light source is, for best results, formed into a low recombination surface, and the emitting surface 25 is treated to provide a high recombination surface. A pair of electrically conducting transparent coatings 26 and 27 are disposed over the facing surfaces 24 and 25, respectively, and in good ohmic contact with the semiconductor (FIG. 5). Bus bars 28 and 29 are disposed in a continuous manner along the margins of the coatings 26 and 27, respectively, providing separate means for connecting the conductive coatings to a selectively variable voltage supply 30.

The requirements for satisfactory coatings 26 and 27 are a high degree of transparency, particularly with respect to wavelengths in the range of operation, and low electrical resistivity. Coatings or films of tin oxide provide both of these requisite physical properties and can be applied relatively easily and "inexpensively." A suitable process for depositing coatings of this type as needed here is recounted in pages 491–509 of Vacuum Disposition of Thin Films by L. Holland, published by J. Wiley and Sons, Incorporated (1956).

Turning to FIG. 4, substantially monochromatic light 31 of predetermined wavelength generated by a source 32 is directed along a path to impinge on the P layer 22. An electric field is established across the composite sheet by directing an electric current from the source 30 via a pair of conductors 33 and 34, bus bars 28 and 29 and the conductive coatings 26 and 27.

The magnitude and direction of the electric field determines the location of the absorption edge in a way similar to the above-described manner. Thus, if the field established across, i.e. through, the junction and the P and N layers is an alternating one having maximum swings of such magnitude as to establish within the composite sheet high and low carrier density in opposite layers, a corresponding alternation of high transmissivity and low transmissivity is obtained providing the desired modulating effect.

There is a definite relation between the particular material, or materials, composing the novel modulating sheet of the above-described devices and the range of wavelengths of radiation that can be effectively controlled thereby, and this is irrespective of the magnitude of the associated magnetic and/or electric field. Accordingly, although InSb is a fully satisfactory material for use with radiation in the range of about 4–8 microns, the efficiency of shuttering or modulating in the sense meant here falls off rapidly for radiation substantially beyond this range.

Other solid state semiconducting materials, such as germanium for example, exhibit the required variable transmissivity and which transmissivity for any particular material is more pronounced over a certain frequency range characteristic of the material. Accordingly, a number of different materials can be used to practise the invention thereby providing a highly desirable flexibility in the wavelengths of light which can be so controlled.

While the invention has been particularly shown and described with reference to a preferred embodiment thereof, it will be understood by those skilled in the art that the foregoing and other changes in form and details may be made therein without departing from the spirit or scope of the invention.

What is claimed is:

1. Apparatus for light switching of a narrow bandpass light beam, comprising: a composite modulating sheet composed of P- and N-type layers in face contacting relation with a diffusion junction therebetween arranged in the path of said light beam such that the light beam impinges onto the P-type layer, said P- and N-type layers having first and second opposite outer faces, respectively, with said junction disposed between said outer faces, said outer face of said P-type layer comprising a low recombination surface upon which said light beam impinges, and said outer face of said N-type layer comprising a high recombination surface; transparent electrically conductive coatings disposed on the outer faces of said modulating sheet and electrically isolated from each other; and selectively variable voltage means connected to said transparent coatings establishing an electric field across said composite sheet whereby controlled carrier concentration within said body is provided corresponding to the magnitude of the impressed electric field and selectively variable transmission of the light beam is effected.

2. Apparatus, as in claim 1, in which the P- and N-type layers are of indium antimonide.

3. Apparatus, as in claim 1, in which the voltage means consists of a controllable alternating voltage source providing as one of its controlled voltages, a voltage one maximum swing of which provides substantial extinction of the light beam.

4. A light switch for controlling a narrow bandpass beam of light directed along a definite path, comprising:

a body of semiconductive material having at least one diffusion junction formed by P- and N-type adjacent layers thereof, said P- and N-type layers having first and second opposite outer faces, respectively, with said junction disposed between said outer faces, said body being positioned with respect to said light beam path such that the light beam is incident to a predetermined one of said faces; and electric field generating means establishing an electric field across said junction, said electrical field being activated by said field generating means to control the intensity of said beam emanating from the other of said faces; one of said faces comprising a low recombination surface and said other of said faces comprising a high recombination surface.

References Cited by the Examiner
UNITED STATES PATENTS

| | | | |
|---|---|---|---|
| 2,692,950 | 10/1954 | Wallace | 250—83.3 |
| 2,914,665 | 11/1959 | Linder | 250—211 X |
| 2,960,914 | 11/1960 | Rogers | 88—61 |
| 2,987,959 | 6/1961 | Kimmel | 88—61 |
| 3,158,746 | 11/1964 | Lehovec. | |

JEWELL H. PEDERSEN, *Primary Examiner.*

W. L. SIKES, *Assistant Examiner.*